No. 719,150. PATENTED JAN. 27, 1903.
J. J. SIGAFOOS.
FARM GATE.
APPLICATION FILED JUNE 4, 1902.
NO MODEL.
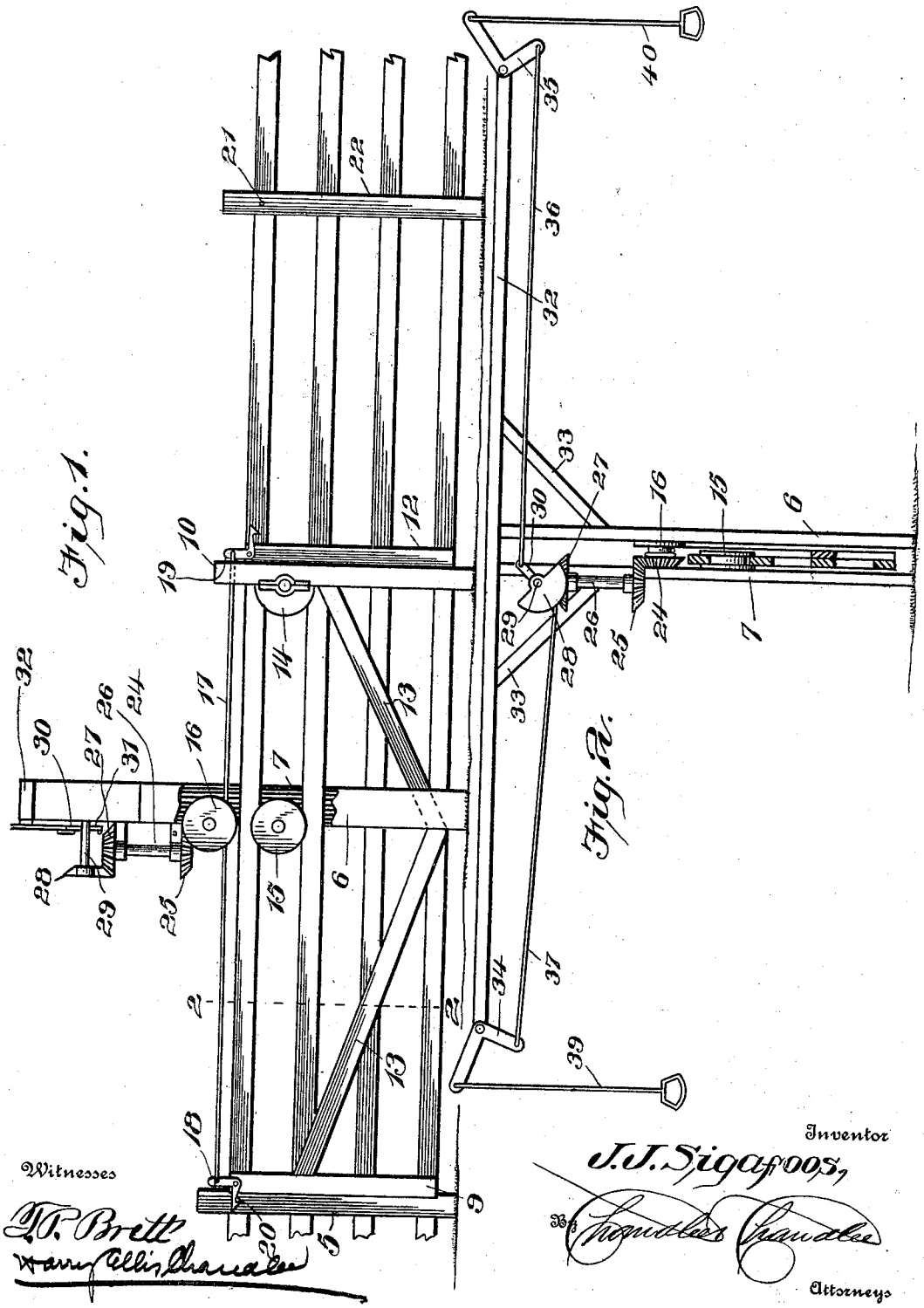
Witnesses
Inventor
J. J. Sigafoos,
Attorneys

UNITED STATES PATENT OFFICE.

JOSIAH J. SIGAFOOS, OF GARNEILL, MONTANA.

FARM-GATE.

SPECIFICATION forming part of Letters Patent No. 719,150, dated January 27, 1903.

Application filed June 4, 1902. Serial No. 110,176. (No model.)

*To all whom it may concern:*

Be it known that I, JOSIAH J. SIGAFOOS, a citizen of the United States, residing at Garneill, in the county of Fergus, State of Montana, have invented certain new and useful Improvements in Farm-Gates; and I do hereby declare the following to be a full, clear, and exact description of the invention, such as will enable others skilled in the art to which it appertains to make and use the same.

This invention relates to a class of sliding gates; and it has for its object to provide a construction in which by the operation of a single lever the gate will be unlatched and opened and latched in its open position and upon the operation of a second lever or the same lever in an opposite direction the gate will be unlatched and closed and latched in its closed position.

In the drawings forming a portion of this specification, and in which like numerals of reference indicate similar parts in the several views, Figure 1 is a side elevation showing the gate in closed position, the center post being shown partly in section to better illustrate the mechanism. Fig. 2 is a section on line 2 2 of Fig. 1.

Referring now to the drawings, there are shown two posts 5 and 10, of which the latter is slotted longitudinally to permit of sliding movement of the gate 11 therethrough into and out of contact with the post 5. Between the posts 5 and 10 and at the opposite side of the gateway from the post 5 is arranged a third post comprising the spaced members 6 and 7, which are disposed at opposite sides of the gate.

The gate comprises uprights 9 and 12, which are connected by the rails, as shown, and suitable braces 13 are provided to prevent sagging of the gate.

In the slot of the post 10 is a roller 14, and between the members 6 and 7 of the intermediate post is a roller 15, these rollers being arranged in the same vertical plane and at the same elevation between the top rail and the next adjacent rail of the gate. These rollers support the gate free from the ground and permit it to be slid longitudinally into and out of contact with the post 5 to close and open the gateway. The spacing of the rails of the gate is such that only a limited tilting of the gate is permitted upon either roller as a pivot.

Between the members 6 and 7 of the intermediate posts and above the gate is journaled a pulley-wheel 16 or winding-drum, upon which is wound a rope 17, the ends of which are taken in opposite directions and are attached to latch-levers 18 and 19 at opposite ends of the gate. The latch-levers 18 and 19, as shown, are angular in shape, the end portions to which the rope is attached standing vertical, while the barbed engaging ends thereof extend laterally from the lower ends of the vertical portions. When the gate is in closed position, the latch 18 is engaged over a pin 20 on the post 5, and if the drum 16 be then rotated to wind that portion of the rope which is connected to the latch 18 said latch will first be swung into disengaged position and the gate will then be slid open. When the gate is in open position, the latch 19 engages the pin 21 of a fence-post 22, and when the drum 16 is rotated in a reverse direction said latch 19 is first rocked from engagement with the pin, and the gate is then slid into closed position.

To rotate the drum 16 first in one direction and then in the other to open and close the gate, said drum is provided with a bevel-gear 24 on one face, and with this gear is engaged a second gear 25, which is carried by a vertical shaft 26, journaled in bearings on the member 7 of the intermediate gate-post, and at the upper end of this shaft 26 is a bevel-gear 27, with which is engaged a segmental gear 28, which is mounted upon a shaft 29, having a bearing in the said member 7. The shaft 29 has radiating arms 30 and 31. At the upper ends of the members 6 and 7 is a cross-beam 32, which is connected to their upper ends and projects beyond both sides of the gate, said cross-beam being provided with braces 33. At the outer ends of the beams 32 are angular levers 34 and 35, which are connected with the arms 30 and 31 by means of the rods 36 and 37, respectively, so that if either lever is rocked in one direction the segmental gear will be moved in one direction, and if either lever be operated in the opposite direction the movement of the segmental gear will be reversed. When the segmental gear is moved in one direction, the drum 16 is rotated to open the gate as above described, and when the gear is moved in the opposite direction the drum is rotated to close the gate. Thus the gate may be opened or closed by the operation of either of the angular levers. To facilitate operation of the levers 34 and 35, rods 39 and 40 are pivoted thereto and are provided at their lower ends with handgrips, as shown.

It will be understood that in practice modifications of the specific construction shown may be made and that any suitable materials and proportions may be used for the various parts without departing from the spirit of the invention.

What is claimed is—

The combination with a gate comprising uprights and connected rails, said gate having angular latches pivoted at the ends of its top rail, each comprising a vertically-extending member and a barbed member projecting laterally beyond the adjacent end of the gate, spaced gate-posts one of which is provided with a pin for engagement by a latch of the gate when the gate is closed, the other being slotted and having the gate arranged slidably in its slot, an intermediate post comprising spaced members lying at opposite sides of the gate, rollers journaled in the slot of the second post and between the members of the intermediate post respectively and lying between the upper rails of the gate to support them and prevent tilting thereof, a winding-drum mounted between the spaced members of the intermediate post and provided with a gear on one face, a segmental gear pivoted upon the intermediate post, a shaft having bevel-gears engaged with the segmental gear and the gear of the drum respectively, a cross-beam at the upper end of the intermediate post having angular levers mounted thereon and connected with the segmental gear for rocking it, a rope wound upon the drum and connected at its ends to the upper ends of the latches, and means for engagement by the second latch.

In testimony whereof I affix my signature in presence of two witnesses.

JOSIAH J. SIGAFOOS.

Witnesses:
JOHN S. JOE,
HENRY JEWELL.